US012633090B2

(12) United States Patent
Ye et al.

(10) Patent No.: US 12,633,090 B2
(45) Date of Patent: May 19, 2026

(54) IMAGE FEATURE EXTRACTION METHOD AND APPARATUS, AND COMPUTER DEVICE AND READABLE STORAGE MEDIUM

(71) Applicant: SOUTHERN UNIVERSITY OF SCIENCE AND TECHNOLOGY, Shenzhen (CN)

(72) Inventors: Tao Ye, Shenzhen (CN); Qi Wang, Shenzhen (CN); Jianghan Zhu, Shenzhen (CN); Shihang Wang, Shenzhen (CN); Xingbo Wang, Shenzhen (CN)

(73) Assignee: Southern University of Science and Technology, Guangdong (CN)

( * ) Notice: Subject to any disclaimer, the term of this patent is extended or adjusted under 35 U.S.C. 154(b) by 348 days.

(21) Appl. No.: 18/396,324

(22) Filed: Dec. 26, 2023

(65) Prior Publication Data

US 2024/0185571 A1 Jun. 6, 2024

Related U.S. Application Data

(63) Continuation-in-part of application No. PCT/CN2022/078874, filed on Mar. 2, 2022.

(30) Foreign Application Priority Data

Aug. 11, 2021 (CN) .......................... 202110917990.5

(51) Int. Cl.
| | |
|---|---|
| *G06V 10/77* | (2022.01) |
| *G06V 10/22* | (2022.01) |
| *G06V 10/82* | (2022.01) |

(52) U.S. Cl.
CPC .......... *G06V 10/7715* (2022.01); *G06V 10/22* (2022.01); *G06V 10/82* (2022.01)

(58) Field of Classification Search
CPC .... G06V 10/7715; G06V 10/22; G06V 10/82; Y02D 10/00; G06N 3/045
See application file for complete search history.

(56) References Cited

U.S. PATENT DOCUMENTS

| | | | |
|---|---|---|---|
| 2020/0151541 A1 | 5/2020 | Meng et al. | |
| 2020/0175313 A1 | 6/2020 | Jang | |

(Continued)

FOREIGN PATENT DOCUMENTS

| | | |
|---|---|---|
| CN | 110136056 A | 8/2019 |
| CN | 110473137 A | 11/2019 |

(Continued)

OTHER PUBLICATIONS

International Search Report issued in PCT Application No. PCT/CN2022/078874, dated May 16, 2022.

(Continued)

*Primary Examiner* — Molly Wilburn
(74) *Attorney, Agent, or Firm* — Hogan Lovells US LLP

(57) ABSTRACT

An image feature extraction method and apparatus are provided, along with a computer device and a readable storage medium. After obtaining the target convolutional kernel of the feature extraction convolutional neural network, this application will cut the input feature map obtained from the preprocessed image according to the preset image size into multiple abutting input feature submaps. Each input feature submap will be zero-padded to obtain the preprocessed feature submap. Then, for each preprocessed feature submap, the Karatsuba algorithm will be used to reduce the multiplier resource consumption during the convolution operation between the target convolutional kernel and the preprocessed feature submap, effectively suppressing the growth of adder resource consumption during the convolution operation, resulting in the output feature submap. Subsequently, multiple output feature submaps will be over- (Continued)

10 lapped and the boundary of the overlapped feature map will
be cropped to obtain the output feature map.

13 Claims, 6 Drawing Sheets

(56)                    References Cited

U.S. PATENT DOCUMENTS

| | | | |
|---|---|---|---|
| 2020/0302265 A1 | 9/2020 | Wang et al. | |
| 2021/0117791 A1* | 4/2021 | Song ..................... | G06N 3/045 |

FOREIGN PATENT DOCUMENTS

| | | |
|---|---|---|
| CN | 110555847 A | 12/2019 |
| CN | 111260037 A | 6/2020 |
| CN | 111738276 A | 10/2020 |
| CN | 113642589 A | 11/2021 |
| WO | 2020/216227 A1 | 10/2020 |

OTHER PUBLICATIONS

Written Opinion issued in PCT Application No. PCT/CN2022/
078874, dated May 16, 2022.
Notification to Grant Patent Right for Invention issued in Chinese
Application No. 202110917990.5, dated May 11, 2023.

* cited by examiner

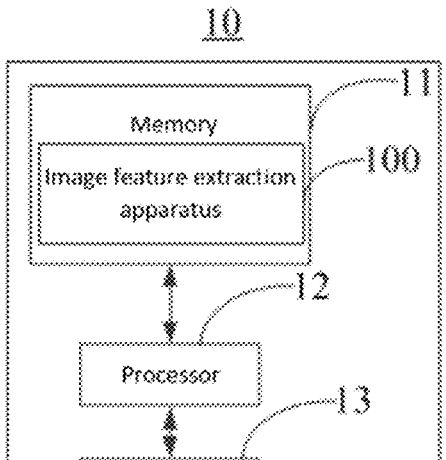

FIG. 1

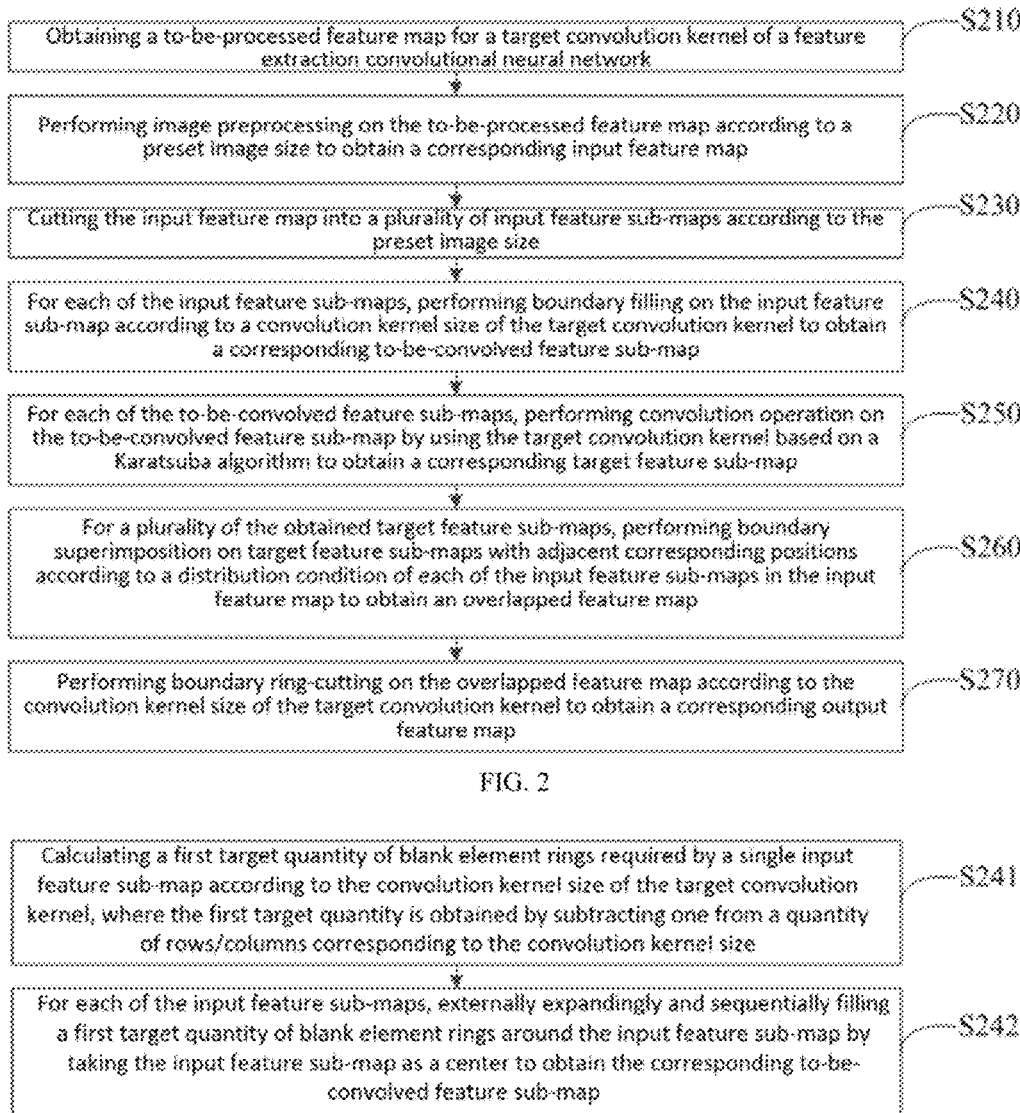

Obtaining a to-be-processed feature map for a target convolution kernel of a feature extraction convolutional neural network ⌐S210

Performing image preprocessing on the to-be-processed feature map according to a preset image size to obtain a corresponding input feature map ⌐S220

Cutting the input feature map into a plurality of input feature sub-maps according to the preset image size ⌐S230

For each of the input feature sub-maps, performing boundary filling on the input feature sub-map according to a convolution kernel size of the target convolution kernel to obtain a corresponding to-be-convolved feature sub-map ⌐S240

For each of the to-be-convolved feature sub-maps, performing convolution operation on the to-be-convolved feature sub-map by using the target convolution kernel based on a Karatsuba algorithm to obtain a corresponding target feature sub-map ⌐S250

For a plurality of the obtained target feature sub-maps, performing boundary superimposition on target feature sub-maps with adjacent corresponding positions according to a distribution condition of each of the input feature sub-maps in the input feature map to obtain an overlapped feature map ⌐S260

Performing boundary ring-cutting on the overlapped feature map according to the convolution kernel size of the target convolution kernel to obtain a corresponding output feature map ⌐S270

FIG. 2

Calculating a first target quantity of blank element rings required by a single input feature sub-map according to the convolution kernel size of the target convolution kernel, where the first target quantity is obtained by subtracting one from a quantity of rows/columns corresponding to the convolution kernel size ⌐S241

For each of the input feature sub-maps, externally expandingly and sequentially filling a first target quantity of blank element rings around the input feature sub-map by taking the input feature sub-map as a center to obtain the corresponding to-be-convolved feature sub-map ⌐S242

FIG. 3

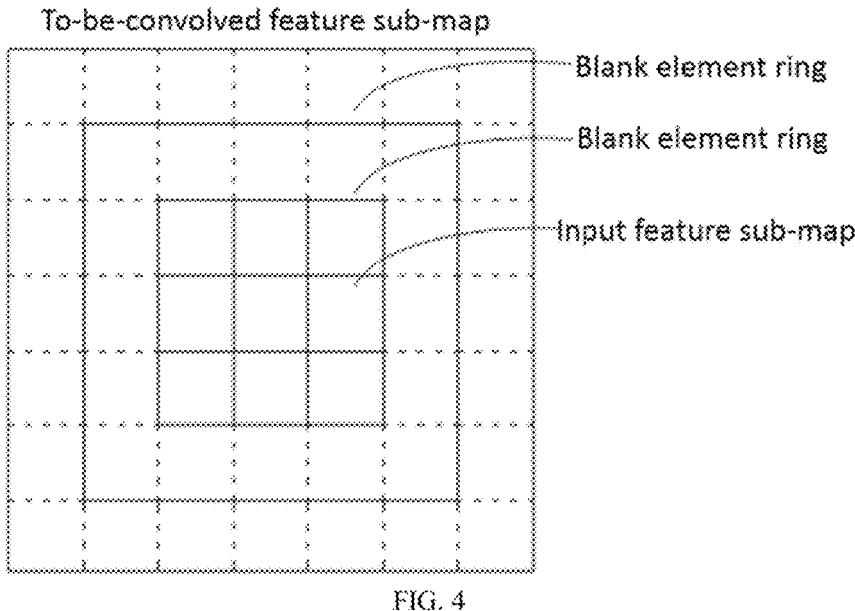

FIG. 4

For each of the to-be-convolved feature sub-maps, constructing a row-column feature expression of the input feature sub-map based on a Karatsuba algorithm according to feature element values of different distribution positions in the corresponding input feature sub-map ⌐S251

For the target convolution kernel, constructing a row-column feature expression of the target convolution kernel based on a Karatsuba algorithm according to convolution element values of different distribution positions in the target convolution kernel ⌐S252

For each of the to-be-convolved feature sub-maps, performing splitting and conversion on a multiplication operation process of the row-column feature expression of the corresponding input feature sub-map and the row-column feature expression of the target convolution kernel based on a Karatsuba algorithm to obtain a corresponding split and converted result ⌐S253

For each of the to-be-convolved feature sub-maps, performing element expression on the corresponding split and converted result based on a preset convolution mapping distribution condition corresponding to the target convolution kernel to obtain the corresponding target feature sub-map ⌐S254

FIG. 5

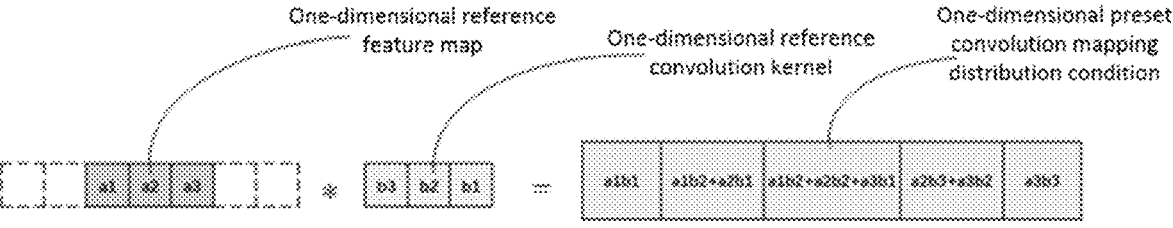

FIG. 6

Two-dimensional preset convolution mapping distribution condition

| | | | | |
|---|---|---|---|---|
| a3b2 | a2b3+a3b2 | a1b3+a2b2+a3b1 | a1b2+a2b1 | a1b1 |
| a3b6 +a6b3 | a2b6+a3b5 +a5b3+a6b2 | a1b6+a2b5+a3b4 +a4b3+a5b2+a6b1 | a1b5+a2b4 +a4b2+a5b1 | a1b4 +a4b1 |
| a3b9 +a6b6 +a9b3 | a2b9+a3b8 +a5b6+a6b5 +a8b3+a9b2 | a1b9+a2b8+a3b7 +a4b6+a5b5+a6b4 +a7b3+a8b2+a9b1 | a1b8+a2b7 +a4b5+a5b4 +a7b2+a8b1 | a1b7 +a4b4 +a7b1 |
| a6b9 +a9b6 | a5b9+a6b8 +a8b6+a9b5 | a4b9+a5b8+a6b7 +a7b6+a8b5+a9b4 | a4b8+a5b7 +a7b5+a8b4 | a4b7 +a7b4 |
| a9b9 | a8b9+a9b8 | a7b9+a8b8+a9b7 | a7b8+a8b7 | a7b7 |

Two-dimensional reference convolution kernel

| b7 | b8 | b9 |
|---|---|---|
| b4 | b5 | b6 |
| b1 | b2 | b3 |

=

Two-dimensional reference feature map

| a3 | a6 | a9 |
|---|---|---|
| a2 | a5 | a8 |
| a1 | a4 | a7 |

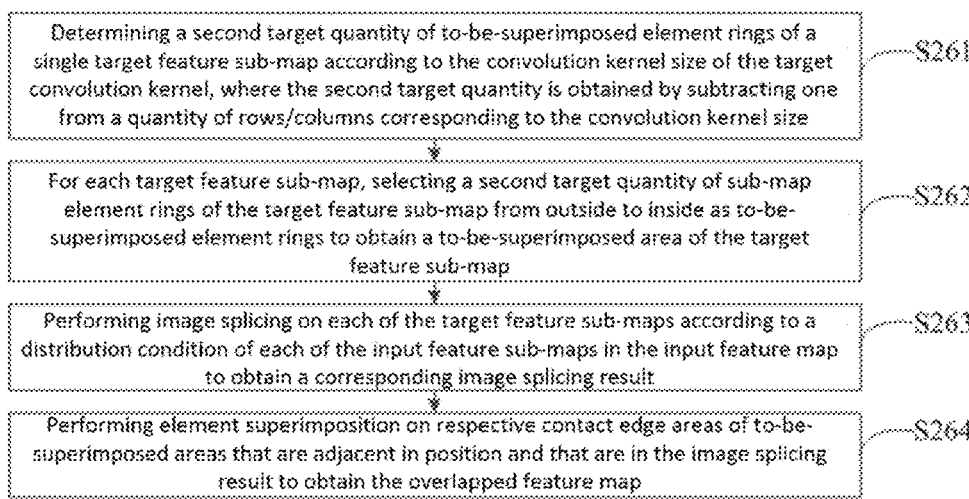

Determining a second target quantity of to-be-superimposed element rings of a single target feature sub-map according to the convolution kernel size of the target convolution kernel, where the second target quantity is obtained by subtracting one from a quantity of rows/columns corresponding to the convolution kernel size ──S261

For each target feature sub-map, selecting a second target quantity of sub-map element rings of the target feature sub-map from outside to inside as to-be-superimposed element rings to obtain a to-be-superimposed area of the target feature sub-map ──S262

Performing image splicing on each of the target feature sub-maps according to a distribution condition of each of the input feature sub-maps in the input feature map to obtain a corresponding image splicing result ──S263

Performing element superimposition on respective contact edge areas of to-be-superimposed areas that are adjacent in position and that are in the image splicing result to obtain the overlapped feature map ──S264

FIG. 8

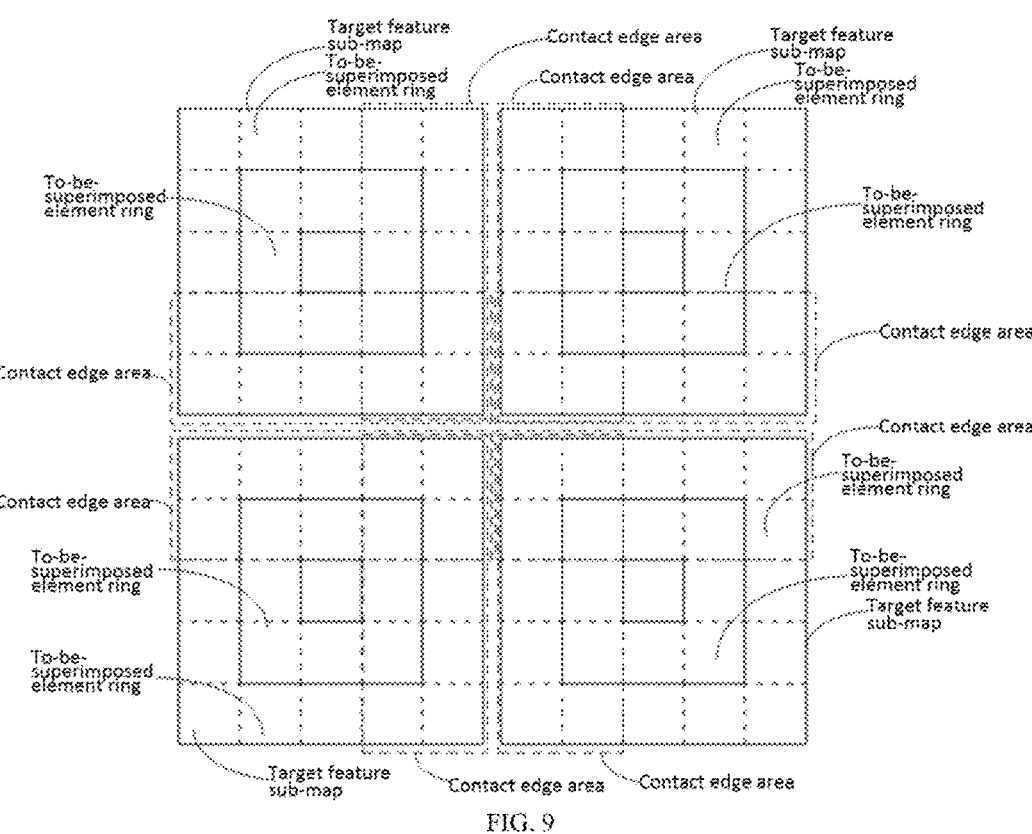

FIG. 9

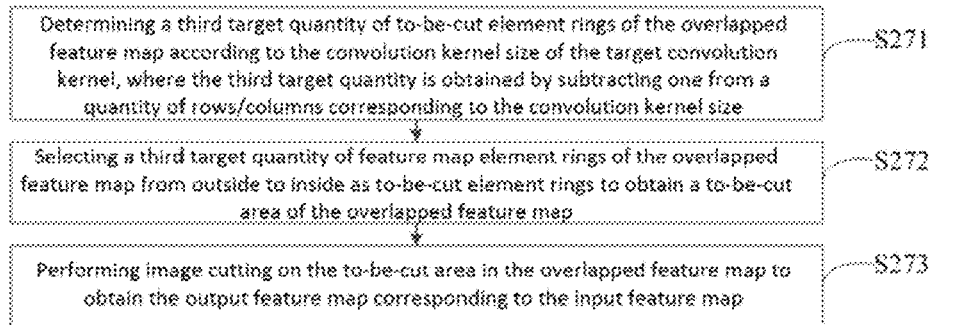

Determining a third target quantity of to-be-cut element rings of the overlapped feature map according to the convolution kernel size of the target convolution kernel, where the third target quantity is obtained by subtracting one from a quantity of rows/columns corresponding to the convolution kernel size ──S271

Selecting a third target quantity of feature map element rings of the overlapped feature map from outside to inside as to-be-cut element rings to obtain a to-be-cut area of the overlapped feature map ──S272

Performing image cutting on the to-be-cut area in the overlapped feature map to obtain the output feature map corresponding to the input feature map ──S273

FIG. 10

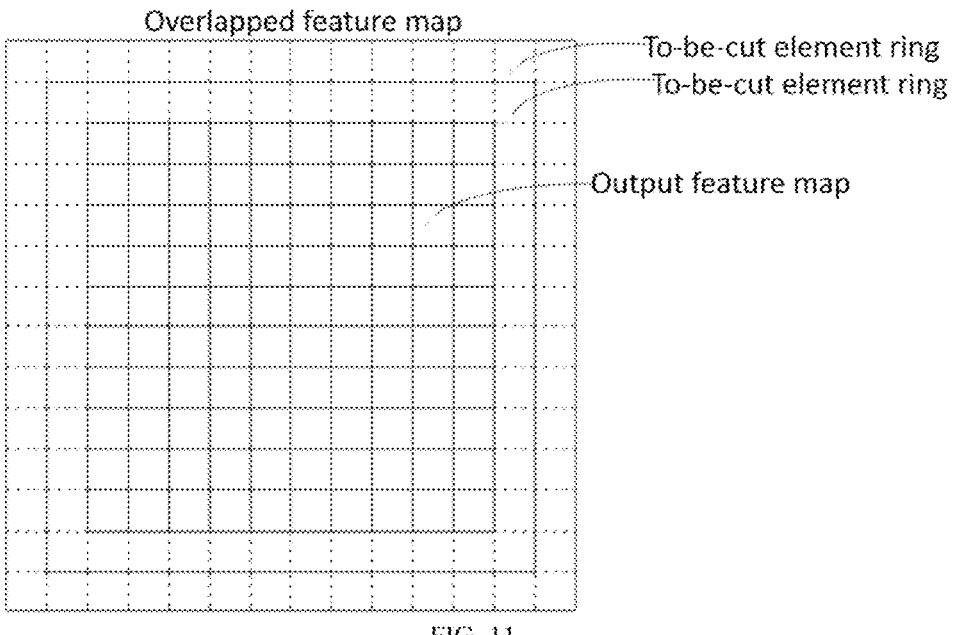

Overlapped feature map

To-be-cut element ring

To-be-cut element ring

Output feature map

FIG. 11

Configuring a preset image size according to a convolution kernel size of a target convolution kernel   —S209

Obtaining a to-be-processed feature map for a target convolution kernel of a feature extraction convolutional neural network   —S210

Performing image preprocessing on the to-be-processed feature map according to a preset image size to obtain a corresponding input feature map   —S220

Cutting the input feature map into a plurality of input feature sub-maps according to the preset image size   —S230

For each of the input feature sub-maps, performing boundary filling on the input feature sub-map according to a convolution kernel size of the target convolution kernel to obtain a corresponding to-be-convolved feature sub-map   —S240

For each of the to-be-convolved feature sub-maps, performing convolution operation on the to-be-convolved feature sub-map by using the target convolution kernel based on a Karatsuba algorithm to obtain a corresponding target feature sub-map   —S250

For a plurality of the obtained target feature sub-maps, performing boundary superimposition on target feature sub-maps with adjacent corresponding positions according to a distribution condition of each of the input feature sub-maps in the input feature map to obtain an overlapped feature map   —S260

Performing boundary ring-cutting on the overlapped feature map according to the convolution kernel size of the target convolution kernel to obtain a corresponding output feature map   —S270

FIG. 12

IMAGE FEATURE EXTRACTION METHOD AND APPARATUS, AND COMPUTER DEVICE AND READABLE STORAGE MEDIUM

CROSS-REFERENCE TO RELATED APPLICATIONS

This application is a continuation-in-part application and claims priority to PCT Application No. PCT/CN2022/078874, filed Mar. 2, 2022, which claims priority to Chinese Patent Application No. 202110917990.5, filed Aug. 11, 2021, the entire disclosures of which are incorporated by reference herein for all intents and purposes.

TECHNICAL FIELD

The present disclosure relates to the technical field of convolution neural networks, and in particular to an image feature extraction method and apparatus, a computer device, and a readable storage medium.

BACKGROUND

With the continuous development of science and technology, the application of machine learning technology in various industries is more extensive. As the most active branch in the field of deep learning research and application in recent years, convolution neural network technology has attracted more attention with the continuous advancement of artificial intelligence technology. People put forward more demands for the specific application of convolution neural network technology, for example, the convolution neural networks are required to have smaller computational resource consumption and higher calculation rates in practical applications (operations such as face feature extraction, and image feature processing).

SUMMARY

In view of this, an objective of the present disclosure is to provide an image feature extraction method and apparatus, a computer device, and a readable storage medium, which can reduce the computational resource consumption during feature extraction, thereby improving the feature extraction efficiency.

To achieve the foregoing objective, the following technical solutions are used in embodiments of the present disclosure.

According to a first aspect, the present disclosure provides an image feature extraction method, where the method includes:

obtaining an original feature map for a target convolution kernel of a feature extraction convolution neural network;

performing image preprocessing on the original feature map according to a preset image size, so as to obtain a corresponding input feature map, where an image size of the input feature map is an integral multiple of the preset image size;

cutting the input feature map into a plurality of abutting input feature submaps according to the preset image size;

for each of the input feature submaps, performing zero-padding on the input feature submap according to a convolution kernel size of the target convolution kernel, so as to obtain a corresponding preprocessed feature submap;

for each of the preprocessed feature submaps, performing convolution operation on the preprocessed feature submap by using the target convolution kernel based on a Karatsuba algorithm, so as to obtain a corresponding output feature submap;

for a plurality of the obtained output feature submaps, overlapping output feature submaps with adjacent corresponding positions according to a distribution condition of each of the input feature submaps in the input feature map, so as to obtain an overlapped feature map; and cropping a boundary of the overlapped feature map according to the convolution kernel size of the target convolution kernel, so as to obtain a corresponding output feature map, where the output feature map is used to represent the feature extraction results obtained by computing the input feature map with its corresponding filter.

In an optional implementation, the step of, for each of the input feature submaps, performing zero-padding on the input feature submap according to a convolution kernel size of the target convolution kernel, so as to obtain a corresponding preprocessed feature submap includes:

calculating a first target quantity of blank element rings required by a single input feature submap according to the convolution kernel size of the target convolution kernel, where the first target quantity is equal to the number of rows/columns corresponding to the convolution kernel size minus one; and for each of the input feature submaps, externally expandingly and sequentially filling a first target quantity of blank element rings around the input feature submap by taking the input feature submap as a center, so as to obtain the corresponding preprocessed feature submap.

In an optional implementation, the step of, for each of the preprocessed feature submaps, performing convolution operation on the preprocessed feature submap by using the target convolution kernel based on a Karatsuba algorithm, so as to obtain a corresponding output feature submap includes:

for each of the preprocessed feature submaps, constructing a row-column feature expression of the input feature submap based on a Karatsuba algorithm according to feature element values of different distribution positions in the corresponding input feature submap;

for the target convolution kernel, constructing a row-column feature expression of the target convolution kernel based on a Karatsuba algorithm according to convolution element values of different distribution positions in the target convolution kernel;

for each of the preprocessed feature submaps, performing splitting and conversion on a multiplication operation process of the row-column feature expression of the corresponding input feature submap and the row-column feature expression of the target convolution kernel based on a Karatsuba algorithm, so as to obtain a corresponding split and converted result; and for each of the preprocessed feature submaps, performing element expression on the corresponding split and converted result based on a preset convolution mapping distribution condition corresponding to the target convolution kernel, so as to obtain the corresponding output feature submap.

In an optional implementation, the step of overlapping output feature submaps with adjacent corresponding positions according to a distribution condition of each of the input feature submaps in the input feature map, so as to obtain an overlapped feature map includes:

determining a second target quantity of to-be-superimposed element rings of a single output feature submap according to the convolution kernel size of the target convolution kernel, where the second target quantity is equal to the number of rows/columns corresponding to the convolution kernel size minus one;

for each output feature submap, selecting a second target quantity of submap element rings of the output feature submap from outside to inside as to-be-superimposed element rings, so as to obtain a to-be-superimposed area of the output feature submap;

performing image splicing on each of the output feature submaps according to a distribution condition of each of the input feature submaps in the input feature map, so as to obtain a corresponding image splicing result; and performing element superimposition on respective contact edge areas of to-be-superimposed areas that are adjacent in position and that are in the image splicing result, so as to obtain the overlapped feature map.

In an optional implementation, the step of cropping the boundary of the overlapped feature map according to the convolution kernel size of the target convolution kernel, so as to obtain a corresponding output feature map includes:

determining a third target quantity of to-be-cut element rings of the overlapped feature map according to the convolution kernel size of the target convolution kernel, where the third target quantity is equal to the number of rows/columns corresponding to the convolution kernel size minus one;

selecting a third target quantity of feature map element rings of the overlapped feature map from outside to inside as to-be-cut element rings, so as to obtain a to-be-cut area of the overlapped feature map; and performing image cutting on the to-be-cut area in the overlapped feature map, so as to obtain the output feature map corresponding to the input feature map.

In an optional implementation, the method further includes:

configuring the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

According to a second aspect, the present disclosure provides an image feature extraction apparatus, where the apparatus includes:

a feature map obtaining module, configured to obtain an original feature map for a target convolution kernel of a feature extraction convolution neural network;

a feature map preprocessing module, configured to perform image preprocessing on the original feature map according to a preset image size, so as to obtain a corresponding input feature map, where an image size of the input feature map is an integral multiple of the preset image size;

an input feature cutting module, configured to cut the input feature map into a plurality of abutting input feature submaps according to the preset image size, where an image size of each of the input feature submaps is consistent with the preset image size;

a submap zero-padding module, configured to, for each of the input feature submaps, perform zero-padding on the input feature submap according to a convolution kernel size of the target convolution kernel, so as to obtain a corresponding preprocessed feature submap;

a feature convolution operation module, configured to, for each of the preprocessed feature submaps, perform convolution operation on the preprocessed feature submap by using the target convolution kernel based on a Karatsuba algorithm, so as to obtain a corresponding output feature submap;

a submap overlapping module, configured to, for a plurality of the obtained output feature submaps, overlap output feature submaps with adjacent corresponding positions according to a distribution condition of each of the input feature submaps in the input feature map, so as to obtain an overlapped feature map; and an output feature extraction module, configured to crop the boundary of the overlapped feature map according to the convolution kernel size of the target convolution kernel, so as to obtain a corresponding output feature map, where the output feature map is used to represent the feature extraction results obtained by computing the input feature map with its corresponding filter.

In an optional implementation, the apparatus further includes:

a cutting size configuration module, configured to configure the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

According to a third aspect, the present disclosure provides a computer device, including a processor and a memory, where the memory stores a computer program that can be executed by the processor, and the processor can execute the computer program to implement the image feature extraction method according to any one of the foregoing implementations.

According to a fourth aspect, the present disclosure provides a readable storage medium. The readable storage medium stores a computer program, and when the computer program is executed by a processor, the image feature extraction method according to any one of the foregoing implementations is implemented.

In this case, the beneficial effects of the embodiments of the present disclosure are as follows.

In the present disclosure, after an original feature map of a target convolution kernel of a feature extraction convolution neural network is obtained, an input feature map obtained by performing image preprocessing on the original feature map is cut into a plurality of abutting input feature submaps according to a preset image size, and zero-padding is performed on each input feature submap, so that a corresponding preprocessed feature submap is obtained; then, for each preprocessed feature submap, a resource loss of a multiplier in the process of a convolution operation of the target convolution kernel and the preprocessed feature submap is reduced by means of a Karatsuba algorithm, and the growth of adder resource consumption in the process of the convolution operation is effectively suppressed, so that a corresponding output feature submap is obtained; overlapping is performed on output feature submaps with adjacent corresponding positions according to a distribution condition of each of the input feature submaps in the input feature map, so that an overlapped feature map is obtained; and finally, cropping is performed on the boundary of the overlapped feature map, so that a corresponding output feature map is obtained. In this way, the overall computational resource consumption during feature extraction is reduced, thereby improving the feature extraction efficiency.

To make the above objectives, features and advantages of the present disclosure comprehensible, preferred embodiments with reference to the accompanying drawings are described in detail below.

BRIEF DESCRIPTION OF THE DRAWINGS

To more clearly illustrate the technical solutions of embodiments of the present disclosure, the drawings required in the embodiments will be briefly described below. It should be understood that the following drawings only illustrate some embodiments of the present disclosure and therefore should not be considered as limitations of the scope, and for those of ordinary skill in the art, other related drawings can be obtained according to these drawings without creative efforts.

FIG. 1 is a schematic diagram of the composition of a computer device according to an embodiment of the present disclosure;

FIG. 2 is a first schematic flowchart of an image feature extraction method according to an embodiment of the present disclosure;

FIG. 3 is a schematic flowchart of sub-steps included in step S240 in FIG. 2;

FIG. 4 is a schematic diagram of the distribution of preprocessed feature submaps according to an embodiment of the present disclosure;

FIG. 5 is a schematic flowchart of sub-steps included in step S250 in FIG. 2;

FIG. 6 is a first schematic diagram showing a preset convolution mapping distribution condition according to an embodiment of this present disclosure;

FIG. 7 is a second schematic diagram showing a preset convolution mapping distribution condition according to an embodiment of this present disclosure;

FIG. 8 is a schematic flowchart of sub-steps included in step S260 in FIG. 2;

FIG. 9 is a schematic diagram showing an image splicing result according to an embodiment of this present disclosure;

FIG. 10 is a schematic flowchart of sub-steps included in step S270 in FIG. 2;

FIG. 11 is a schematic diagram of the distribution of overlapped feature maps according to an embodiment of the present disclosure;

FIG. 12 is a second schematic flowchart of an image feature extraction method according to an embodiment of the present disclosure;

Figure 13:
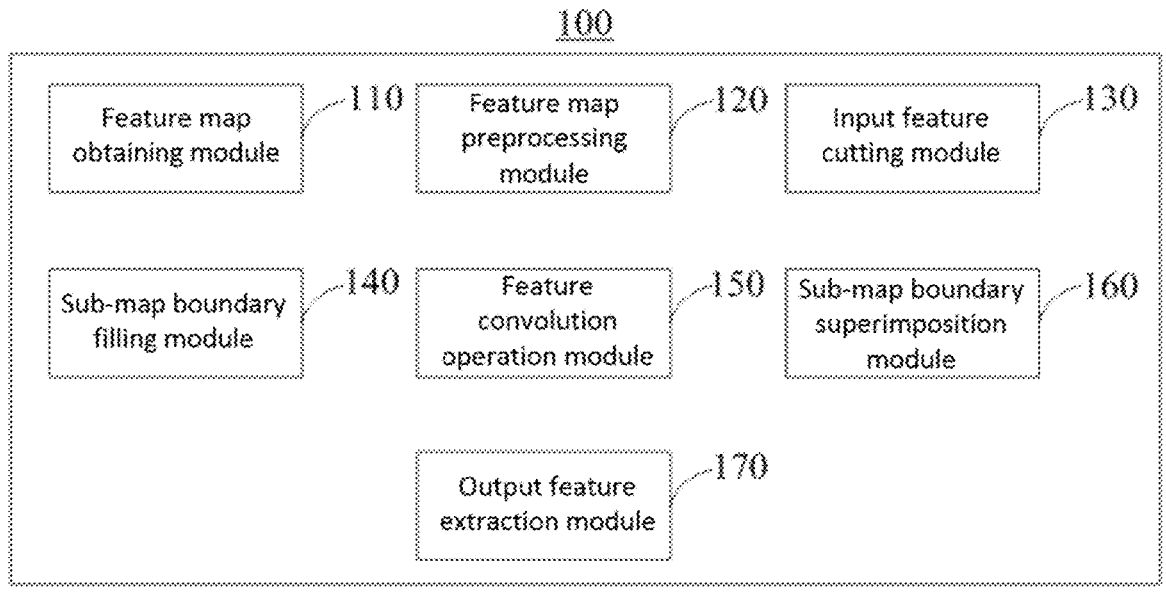
FIG. 13 is a first schematic flowchart of the composition of an image feature extraction apparatus according to an embodiment of the present disclosure.

Reference numerals: 10: computer device; 11: memory; 12: processor; 13: communication unit; 100: image feature extraction apparatus; 110: feature map obtaining module; 120: feature map preprocessing module; 130: input feature cutting module; 140: submap zero-padding module; 150: feature convolution operation module; 160: submap overlapping module; 170: output feature extraction module; and 180: cutting size configuration module.

DETAILED DESCRIPTION OF THE EMBODIMENTS

To make the objectives, technical solutions, and advantages of embodiments of the present disclosure clearer, the following clearly and completely describes the technical solutions in embodiments of the present disclosure with reference to the accompanying drawings in embodiments of the present disclosure. It is clear that the described embodiments are merely some rather than all of embodiments of the present disclosure. Generally, components of embodiments of the present disclosure described and shown in the accompanying drawings herein may be arranged and designed in various configurations.

Therefore, the following detailed description of embodiments of the present disclosure provided in the accompanying drawings is not intended to limit the scope of the present disclosure as claimed, but is merely representative of selected embodiments of the present disclosure. All other embodiments obtained by those of ordinary skill in the art based on embodiments of the present disclosure without creative efforts shall fall within the protection scope of the present disclosure.

It should be noted that similar reference numerals and letters indicate similar items in the following accompanying drawings, and therefore, once an item is defined in one of the accompanying drawings, no further definition or explanation is required in the following accompanying drawings.

In the descriptions of the present disclosure, it should be understood that the relational terms such as "first" and "second" used herein are merely used to distinguish one entity or operation from another entity or operation without necessarily requiring or implying any actual relationship or order between such entities or operations. Moreover, terms "include", "comprise", or any other variants thereof are intended to cover a non-exclusive inclusion, so that a process, a method, an article, or a device that includes a list of elements includes those elements, and also includes other elements which are not expressly listed, or further includes elements inherent to this process, method, article, or device. Without further limitation, an element defined by the phrase "including a/an . . . " does not exclude the presence of another identical elements in the process, method, article or device that includes the element. Those of ordinary skill in the art may understand specific meanings of the foregoing terms in the present disclosure based on a specific situation.

After survey, the applicant finds that a fast Fourier transform (FFT) algorithm or a Winograd algorithm can be used in the specific application process of the convolution neural network to optimize the convolution operation, so that the originally required computational resource consumption of the convolution neural network is reduced, thereby improving the operation efficiency.

However, it should be noted that the convolution optimization process implemented by using the FFT algorithm is to convert the convolution operation in a time domain into a product operation in a frequency domain, where complex operation is involved, one complex multiplication is equivalent to four real multiplication and addition operations, which greatly increases a memory bandwidth requirement when the convolution neural network is in operation, and as a whole, the multiplier resource consumption and the adder resource consumption are still more, and the convolution optimization effect is poor.

In the convolution optimization process implemented by using the Winograd algorithm, data is mapped to another real number space, and addition and subtraction operation is used to replace part of multiplication operation, so that the operation efficiency is improved under the condition that an addition and subtraction operation speed is far higher than that of a multiplication operation, and the loss of calculation resources required by the operation of a multiplier is far higher than that of an adder. However, the replacement of the part of the multiplication operation can be completed only by frequently requiring a large amount of adder resource consumption, therefore, this method essentially has the problem of excessive adder resource consumption, and the overall convolution optimization effect is still poor.

In this case, to effectively reduce the computational resource consumption when a feature extraction convolution neural network performs feature extraction operation and improve the feature extraction efficiency, that is, improve the convolution optimization effect of the feature extraction convolution neural network, embodiments of the present disclosure implement the foregoing functions by providing an image feature extraction method and apparatus, a computer device, and a readable storage medium.

The following describes some embodiments of the present disclosure in detail with reference to accompanying drawings. The following embodiments and features in the embodiments can be combined with each other without conflict.

Referring to FIG. 1, FIG. 1 is a schematic diagram of the composition of a computer device 10 according to an embodiment of the present disclosure. In this embodiment of the present disclosure, the computer device 10 is configured to quickly implement image feature extraction operation. The computer device 10 stores a feature extraction convolution neural network, and can effectively optimize a convolution operation process of the feature extraction convolution neural network in a process of performing feature extraction on a to-be-processed image based on the feature extraction convolution neural network, so that multiplier resource consumption corresponding to an original convolution operation process is effectively reduced, and the growth of adder resource consumption corresponding to the original convolution operation process is synchronously and effectively suppressed, thereby reducing the overall computational resource consumption during feature extraction, improving feature extraction efficiency, and improving a convolution optimization effect of the neural network. The computer device 10 may be, but is not limited to, a smart phone, a tablet computer, a personal computer, a server, and the like.

In this embodiment, the computer device 10 may include a memory 11, a processor 12, a communication unit 13, and an image feature extraction apparatus 100. The elements of the memory 11, the processor 12, and the communication unit 13 are electrically connected to each other directly or indirectly, so as to implement data transmission or interaction. For example, these elements of the memory 11, the processor 12, and the communication unit 13 can be electrically connected to each other via one or more communication buses or signal lines.

In this embodiment, the memory 11 may be, but is not limited to, a Random Access Memory (RAM), a Read Only Memory (ROM), a Programmable Read-Only Memory (PROM), an Erasable Programmable Read-Only Memory (EPROM), an Electric Erasable Programmable Read-Only Memory (EEPROM), and the like. The memory 11 is configured to store a computer program, and the processor 12 can execute the computer program accordingly after receiving an execution instruction. The memory 11 is further configured to store a feature extraction convolution neural network to facilitate image feature extraction operation using the feature extraction convolution neural network. The feature extraction convolution neural network may include at least one convolution layer, and each convolution layer may include at least one special convolution kernel for extracting an image feature, and the special convolution kernel may be a 3×3 convolution kernel or a 5×5 convolution kernel.

In this embodiment, the processor 12 may be an integrated circuit chip that has a signal processing capability. The processor 12 may be a general-purpose processor, including one of a central processing unit (CPU), a graphics processing unit (GPU) or a network processor (NP), a digital signal processor (DSP), an application-specific integrated circuit (ASIC), a field programmable gate array (FPGA) or another programmable logic device, a discrete gate or a transistor logic device, and a discrete hardware component. The general-purpose processor may be a microprocessor or the processor may be any conventional processor, which may implement or perform the method, the steps, and the logical block diagrams disclosed in embodiments of the present discourse.

In this embodiment, the communication unit 13 is configured to establish a communication connection between the computer device 10 and another electronic device through a network, and to send and receive data through the network, where the network includes a wired communication network and a wireless communication network. For example, the computer device 10 may be in communication connection with a smartphone through the communication unit 13 to obtain a to-be-processed image requiring feature extraction from the smart phone.

In this embodiment, the image feature extraction apparatus 100 includes at least one software function module that can be stored in the memory 11 or in the operating system of the computer device 10 in a form of software or firmware. The processor 12 may be configured to execute an executable module stored by the memory 11, such as a software functional module and a computer program included in the image feature extraction apparatus 100. The computer device 10 can effectively optimize a convolution operation process of the feature extraction convolution neural network in the process of performing feature extraction on the to-be-processed image by using the feature extraction convolution neural network through the image feature extraction apparatus 100, so that multiplier resource consumption corresponding to an original convolution operation process is effectively reduced, and the growth of adder resource consumption corresponding to the original convolution operation process is synchronously and effectively suppressed, thereby reducing the overall computational resource consumption during feature extraction, improving feature extraction efficiency, and improving a convolution optimization effect of the neural network.

It may be understood that the block diagram shown in FIG. 1 is only a schematic diagram of the composition of the computer device 10. The computer device 10 may also include more or fewer components than that shown in FIG. 1, or have a different configuration than that shown in FIG. 1. The components shown in FIG. 1 may be implemented in hardware, software, or a combination thereof.

In the present disclosure, to ensure that the computer device 10 can effectively reduce multiplier resource consumption in the image feature extraction process, and synchronously suppress the growth of adder resource consumption in the image feature extraction process to improve the convolution optimization effect of the neural network, an embodiment of the present disclosure implements the foregoing functions by providing an image feature extraction method. The image feature extraction method provided in the present disclosure is described in detail below.

Referring to FIG. 2, FIG. 2 is a first schematic flowchart of an image feature extraction method according to an embodiment of the present disclosure. In this embodiment, the image feature extraction method shown in FIG. 2 may include step S210 to step S260.

Step S210: obtaining an original feature map for a target convolution kernel of a feature extraction convolution neural network.

In this embodiment, the target convolution kernel is a convolution kernel that is in the feature extraction convolution neural network and that needs to implement a feature extraction operation, and a convolution kernel size of the target convolution kernel may be, but is not limited to, 3×3, 5×5, and the like. The original feature map is a feature image that needs to use the target convolution kernel to implement the feature extraction operation.

Step S220: performing image preprocessing on the original feature map according to a preset image size, so as to obtain a corresponding input feature map.

In this embodiment, the preset image size is used to represent a standard size of an input feature map when the input feature map is cut. After the computer device 10 obtains the original feature map, the original feature map is subjected to image preprocessing based on the preset image size, so that the image size of the input feature map obtained by image preprocessing is an integral multiple of the preset image size. It may be understood that if an image size of the original feature map is not an integral multiple of the preset image size, the image preprocessing will correspondingly include an image filling operation, and a blank element with a zero element value can be filled around the boundary or at a side edge position of the original feature map, so that an image size of the finally obtained input feature map is an integral multiple of the preset image size. In an implementation of this embodiment, the image preprocessing may further include any one or a combination of image digitization processing, image geometric transformation processing, image normalization processing, image smoothing processing, image restoration processing, image enhancement, and other operations.

Step S230: cutting the input feature map into a plurality of abutting input feature submaps according to the preset image size.

In this embodiment, the preset image size is used to represent a standard size of the input feature map when the input feature map is cut, and a submap size of each of the input feature submaps is consistent with the preset image size. The preset image size usually needs to be equal to or greater than a convolution kernel size of the target convolution kernel. That is, a quantity of rows of an image element corresponding to the preset image size is greater than or equal to a quantity of rows of a convolution element corresponding to the convolution kernel size of the target convolution kernel, and a quantity of columns of an image element corresponding to the preset image size is greater than or equal to a quantity of columns of a convolution element corresponding to the convolution kernel size of the target convolution kernel. A plurality of the cut input feature submaps can be spliced with each other to obtain the input feature map.

Step S240: for each of the input feature submaps, performing zero-padding on the input feature submap according to a convolution kernel size of the target convolution kernel, so as to obtain a corresponding preprocessed feature submap.

In this embodiment, the preprocessed feature submap is used to represent a feature submap that can be directly subjected to convolution operation with the target convolution kernel. After obtaining a plurality of abutting input feature submaps corresponding to the input feature map, the computer device 10 may perform zero-padding on a single input feature submap according to a convolution kernel size of the corresponding target convolution kernel, so as to ensure that the obtained preprocessed feature submap is adapted to the target convolution kernel in a convolution operation dimension.

Optionally, referring to FIG. 3 and FIG. 4 in combination, FIG. 3 is a schematic flowchart of sub-steps included in step S240 in FIG. 2, and FIG. 4 is a schematic diagram of the distribution of preprocessed feature submaps according to an embodiment of the present disclosure. In this embodiment, the step S240 may include sub-step S241 to sub-step S242.

Sub-step S241: calculating a first target quantity of blank element rings required by a single input feature submap according to the convolution kernel size of the target convolution kernel, where the first target quantity is equal to the number of rows/columns corresponding to the convolution kernel size minus one.

The blank element ring is used to represent that a plurality of blank elements included in the blank element ring are mutually close and distributed in a hollow ring shape, and an element value of each blank element is zero. The first target quantity is used to represent a quantity of blank element rings required to be filled when a corresponding input feature submap is subjected to zero-padding, and the first target quantity is equal to the number of rows/columns corresponding to the convolution kernel size of the target convolution kernel minus one.

Sub-step S242: for each of the input feature submaps, externally expandingly and sequentially filling a first target quantity of blank element rings around the input feature submap by taking the input feature submap as a center, so as to obtain the corresponding preprocessed feature submap.

In this embodiment, after determining a quantity (i.e., the first target quantity) of blank element rings that need to be filled in a single input feature submap, the computer device 10 correspondingly fills the first target quantity of blank element rings in a sleeving manner around the boundary of the corresponding input feature submap to form a corresponding preprocessed feature submap. If a plurality of blank element rings are filled, the blank element ring with a smaller quantity of elements in two adjacent blank element rings is embedded in a hollow portion of the blank element ring with a larger quantity of elements. The preprocessed feature submap shown in FIG. 4 is taken as an example. If a convolution kernel size of the target convolution kernel is 3×3, and a submap size of the input feature submap (formed by splicing a plurality of solid grids in FIG. 4, where each solid grid represents one submap element of input feature submap) is also 3×3, the first target quantity for the input feature submap is 3−1=2, and then 2 blank element rings are externally expandingly and sequentially filled around the boundary of the input feature submap with an input feature submap as a center, so that the 2 blank element rings are nested together, and a quantity of elements of the blank element ring closer to the input feature submap is smaller.

Therefore, by performing the sub-step S241 and the sub-step S242, the present disclosure ensures that the constructed preprocessed feature submap and the corresponding target convolution kernel are adapted to each other in the convolution operation dimension.

Step S250: for each of the preprocessed feature submaps, performing convolution operation on the preprocessed feature submap by using the target convolution kernel based on a Karatsuba algorithm, so as to obtain a corresponding output feature submap.

In this embodiment, after obtaining a preprocessed feature submap corresponding to an input feature submap, the computer device 10 may perform correlation processing by using a Karatsuba algorithm in a process of performing convolution operation on the preprocessed feature submap and a target convolution kernel to obtain an input feature submap that completes the convolution operation and that correspond to the input feature submap, so that a small amount of adder resource consumption is used by using the Karatsuba algorithm to replace part of original multiplication calculation in the convolution operation process, thereby reducing multiplier resource consumption in the convolution operation process between the target convolution kernel and the preprocessed feature submap, and effectively suppressing the growth of adder resource consumption in the convolution operation process. The Karatsuba algorithm can divide the product operation of a multiplier and a multiplicand participating in operation into three partial product operations based on the divide-and-conquer idea, so that the multiplication resource consumption required by the original product operation is reduced, and a corresponding multiplication calculation effect can be achieved by a small amount of addition resource consumption.

Optionally, referring to FIG. 5, FIG. 6, and FIG. 7. FIG. 5 is a schematic flowchart of sub-steps included in step S250 in FIG. 2, FIG. 6 is a first schematic diagram showing a preset convolution mapping distribution condition according to an embodiment of this present disclosure, and FIG. 7 is a second schematic diagram showing a preset convolution mapping distribution condition according to an embodiment of this present disclosure. In this embodiment, the step S250 may include sub-step S251 to sub-step S254.

Sub-step S251: for each of the preprocessed feature submaps, constructing a row-column feature expression of the input feature submap based on a Karatsuba algorithm according to feature element values of different distribution positions in the corresponding input feature submap.

In this embodiment, the row-column feature expression of the preprocessed feature submap is used to represent an effective image feature that is in the corresponding preprocessed feature submap and that is matched with the input feature submap. In the process of constructing the matched row-column feature expression based on the Karatsuba algorithm, effective image features of the corresponding input feature submap can be regarded as values comprehensively formed by the feature element values of different distribution positions according to row-column distribution. In this case, a row feature expression of the same element row can be constructed by using the Karatsuba algorithm based on each of the feature element values that are in the input feature submap and that are in this element row, where the row feature expression takes each of the feature element values in this element row as an element row expression weight, a distribution digit of each of the feature element values is taken as a row feature expression power, and a row feature expression base is used for multiplication and addition to obtain the row feature expression. Then, the row feature expressions of different element rows are used as element column expression weights of the input feature submap, the distribution digit of the row feature expression of each of the element rows is taken as a column feature expression power, and multiplication and addition is performed by using a column feature expression base to obtain a row-column feature expression of the input feature submap.

The schematic diagram showing a preset convolution mapping distribution condition shown in FIG. 6 is taken as an example. For a one-dimensional reference feature map with a similar composition to that of the preprocessed feature submap, the effective feature submap contents corresponding to the one-dimensional reference feature map are non-blank elements a1, a2, and a3, and these three non-blank elements are in the same element row, so that the row-column feature expression of the one-dimensional reference feature map may be $A=a1+a2*X^n+a3*X^{2n}$, where X is used to represent the row feature expression base, and n is used to represent the distribution digit of each of the non-blank elements.

The schematic diagram showing a preset convolution mapping distribution condition shown in FIG. 7 is taken as an example. For a two-dimensional reference feature map with a similar composition to that of the preprocessed feature submap, the effective feature submap contents corresponding to the two-dimensional reference feature map are non-blank elements a1, a2, a3, a4, a5, a6, a7, a8, and a9, where the first three non-blank elements are in the same element row, the middle three non-blank elements are in the same element row, and the last three non-blank elements are in the same element row. Therefore, the two-dimensional reference feature map has row feature expressions corresponding to 3 element rows, that is: $A_1=a1+a2*X^n+a3*X^{2n}$, $A_2=a4+a5*X^n+a6*X^{2n}$, and $A_3=a7+a8*X^n+a9*X^{2n}$, and the two-dimensional reference feature has a row-column feature expression of $A=A_1+A_2*Y^m+A_3*Y^{2m}$, where Y is used to represent the column feature expression base, and m is used to represent the distribution bits of each of the element rows.

Sub-step S252: for the target convolution kernel, constructing a row-column feature expression of the target convolution kernel based on a Karatsuba algorithm according to convolution element values of different distribution positions in the target convolution kernel.

In this embodiment, the row-column feature expression of the target convolution kernel is used to represent the effective image feature of the corresponding target convolution kernel. In the process of constructing the matched row-column feature expression based on the Karatsuba algorithm, effective image features of the corresponding target convolution kernel can be regarded as values comprehensively formed by the convolution element values of different distribution positions according to row-column distribution. In this case, a row feature expression of the same element row can be constructed by using the Karatsuba algorithm based on each of the convolution element values that are in the target convolution kernel and that are in this element row, the row feature expression takes each of the convolution element values in this element row as an element row expression weight, a distribution digit of the convolution element values is taken as a row feature expression power, and a row feature expression base is used for multiplication and addition to obtain the row feature expression. Then, the row feature expressions of different element rows are used as element column expression weights of the target convolution kernel, the distribution digit of the row feature expression of each of the element rows is taken as a column feature expression power, and multiplication and addition is performed by using a column feature expression base to obtain a row-column feature expression of the target convolution kernel.

The schematic diagram showing a preset convolution mapping distribution condition shown in FIG. 6 is taken as an example. For a one-dimensional reference convolution kernel with a similar composition to that of the target convolution kernel, the effective features corresponding to the one-dimensional reference convolution kernel are non-blank elements b1, b2, and b3, and these three non-blank elements are in the same element row, so that the row-column feature expression of the one-dimensional reference convolution kernel is $B = b1 + b2*X^n + b3*X^{2n}$.

The schematic diagram showing a preset convolution mapping distribution condition shown in FIG. 7 is taken as an example. For a two-dimensional reference convolution kernel with a similar composition to that of the target convolution kernel, the effective features of the two-dimensional reference convolution kernel are non-blank elements b1, b2, b3, b4, b5, b6, b7, b8, and b9, where the first three non-blank elements are in the same element row, the middle three non-blank elements are in the same element row, and the last three non-blank elements are in the same element row, then the two-dimensional reference convolution kernel has row feature expressions corresponding to 3 element rows, that is, $B_1 = b1 + b2*X^n + b3*X^{2n}$, $B_2 = b4 + b5*X^n + b6*X^{2n}$, and $B_3 = b7 + b8*X^n + b9*X^{2n}$, and then the row-column feature expression of the two-dimensional reference convolution kernel is $B = B_1 + B_2*Y^m + B_3*Y^{2m}$.

Sub-step S253: for each of the preprocessed feature submaps, performing splitting and conversion on a multiplication operation process of the row-column feature expression of the corresponding input feature submap and the row-column feature expression of the target convolution kernel based on a Karatsuba algorithm, so as to obtain a corresponding split and converted result.

In this embodiment, after the row-column feature expression corresponding to a preprocessed feature submap is determined, each the weight coefficients of an expression in the multiplication operation between the row-column feature expression of the preprocessed feature submap and the row-column feature expression of the target convolution kernel is split and converted, so as to achieve a corresponding multiplication calculation effect by using a small amount of addition resource consumption, thereby reducing the multiplication resource consumption required by the original product operation to obtain a corresponding split and converted result.

The schematic diagram showing a preset convolution mapping distribution condition shown in FIG. 6 is taken as an example. If the row-column feature expressions of the one-dimensional reference feature map and the one-dimensional reference convolution kernel are subjected to multiplication operation, the corresponding multiplication operation process can be expressed as $$A \times B = a3 \cdot b3 * X^{4n} + (a3 \cdot b2 + a2 \cdot b3)*X^{3n} + (a3 \cdot b1 + a2 \cdot b2 + a1 \cdot b3)*X^{2n} + (a1 \cdot b2 + a2 \cdot b1)*X^n + a1 \cdot b1$$

and then the splitting and conversion is performed by using $$\begin{cases} (a3 \cdot b2 + a2 \cdot b3) = (a2 + a3)*(b2 + b3) - a2 \cdot b2 - a3 \cdot b3 \\ (a2 \cdot b1 + a1 \cdot b2) = (a2 + a1)*(b2 + b1) - a2 \cdot b2 - a1 \cdot b1 \\ (a3 \cdot b1 + a1 \cdot b3) = (a3 + a1)*(b3 + b1) - a3 \cdot b3 - a1 \cdot b1 \end{cases}$$

14 to obtain the corresponding split and converted result $$A \times B = a3 \cdot b3 * (X^{4n} - X^{3n} - X^{2n}) + a2 \cdot b2 * (X^{2n} - X^{3n} - X^n) + a1 \cdot b1 * (X^0 - X^{2n} - X^n) + (a2 + a3)*(b2 + b3)*X^{3n} + (a2 + a1)*(b2 + b1)*X^n + (a3 + a1)*(b3 + b1)*X^{2n}$$

The schematic diagram showing a preset convolution mapping distribution condition shown in FIG. 7 is taken as an example. If the row-column feature expressions of the two-dimensional reference feature map and the two-dimensional reference convolution kernel are multiplied, the corresponding multiplication operation process can be expressed as $$A \times B = A_3 \times B_3 * Y^{4m} + (A_3 \times B_2 + A_2 \times B_3)*Y^{3m} + (A_3 \cdot B_1 + A_2 \times B_2 + A_2 \times B_3)*Y^{2m} + (A_1 \times B_2 + A_2 \times B_1)*Y^m + A_1 \times B_1$$

and then the multiplication operation is split and converted by using a splitting formula group similar to $$\begin{cases} (a3 \cdot b2 + a2 \cdot b3) = (a2 + a3)*(b2 + b3) - a2 \cdot b2 - a3 \cdot b3 \\ (a2 \cdot b1 + a1 \cdot b2) = (a2 + a1)*(b2 + b1) - a2 \cdot b2 - a1 \cdot b1 \\ (a3 \cdot b1 + a1 \cdot b3) = (a3 + a1)*(b3 + b1) - a3 \cdot b3 - a1 \cdot b1 \end{cases}$$

so as to obtain a corresponding split and converted result $$A \times B = A_3 \times B_3 * (Y^{4m} - Y^{3m} - Y^{2m}) + A_2 \times B_2 * (Y^{2m} - Y^{3m} - Y^m) + A_1 \times B_1 * (Y^0 - Y^{2m} - Y^m) + (A_2 + A_3) \times (B_2 + B_3) * Y^{3m} + (A_2 + A_1) \times (B_2 + B_1)*Y^m + (A_1 + A_3) \times (B_1 + B_3)*Y^{2m}$$

Therefore, in the present disclosure, by performing the sub-step S253, the corresponding multiplication calculation effect is achieved by using only a small amount of addition resource consumption, thereby reducing the multiplication resource consumption required by the original product operation to obtain a corresponding split and converted result.

Sub-step S254: for each of the preprocessed feature submaps, performing element expression on the corresponding split and converted result based on a preset convolution mapping distribution condition corresponding to the target convolution kernel, so as to obtain the corresponding output feature submap.

In this embodiment, the preset convolution mapping distribution condition is used to represent a calculated mapping relationship between feature element values at different positions in the feature map result and each of the feature element values in the reference feature map and each of the convolution element values in the reference convolution kernel in the feature map result obtained through a correlation convolution operation based on the mutually adapted reference feature map and the reference convolution kernel. For example, the one-dimensional preset convolution mapping distribution condition in FIG. 6 is mutually adapted to a one-dimensional reference feature map and a one-dimensional reference convolution kernel, and the two-dimensional preset convolution mapping distribution condition in FIG. 7 is mutually adapted to a two-dimensional reference feature map and a two-dimensional reference convolution kernel. After obtaining a split and converted result that corresponds to a preprocessed feature submap and that is matched with a target convolution kernel, the computer device 10 may construct a feature map of the split and converted result by using a preset convolution mapping distribution condition in a format that is matched with the preprocessed feature submap and the target convolution kernel, and express specific element value of each of the elements in the constructed feature map to obtain a output feature submap corresponding to the preprocessed feature submap.

Therefore, the present disclosure can use a small amount of adder resource consumption to replace part of the original multiplication calculation in the convolution operation by performing the sub-step S251 to sub-step S254, so as to reduce the multiplier resource consumption in the convolution operation between the target convolution kernel and the preprocessed feature submap, and effectively suppress the growth of adder resource consumption in the convolution operation.

Step S260: for a plurality of the obtained output feature submaps, overlapping output feature submaps with adjacent corresponding positions according to a distribution condition of each of the input feature submaps in the input feature map to obtain an overlapped feature map.

In this embodiment, after the output feature submaps that correspond to each input feature submap and that are subjected to convolution processing by the target convolution kernel are determined, the feature splicing operation of a plurality of output feature submaps can be achieved by overlapping the plurality of output feature submaps.

Optionally, referring to FIG. 8 and FIG. 9, FIG. 8 is a schematic flowchart of sub-steps included in step S260 in FIG. 2, and FIG. 9 is a schematic diagram showing an image splicing result according to an embodiment of this present disclosure. In this embodiment, the step S260 may include sub-step S261 to sub-step S264.

Sub-step S261: determining a second target quantity of to-be-superimposed element rings of a single output feature submap according to the convolution kernel size of the target convolution kernel, where the second target quantity is equal to the number of rows/columns corresponding to the convolution kernel size minus one.

In this embodiment, the to-be-superimposed element ring is used to represent a plurality of feature elements that are distributed in a hollow ring shape in the corresponding output feature submap and that need to be superimposed on other output feature submaps. The second target quantity is used to represent a quantity of to-be-superimposed element rings that are close to the boundary and that are of the corresponding output feature submap, the to-be-superimposed element rings that are far away from the boundary and that are in adjacent to-be-superimposed element rings of the same output feature submap are nested by the to-be-superimposed element rings that are close to the boundary, and the second target quantity is equal to the number of rows/columns corresponding to the convolution kernel size of the target convolution kernel minus one.

Sub-step S262: for each output feature submap, selecting a second target quantity of submap element rings of the output feature submap from outside to inside as to-be-superimposed element rings, so as to obtain a to-be-superimposed area of the output feature submap.

In this embodiment, after determining a quantity (i.e., the second target quantity) of to-be-superimposed element rings that need to be superimposed on a single output feature submap, the computer device 10 correspondingly selects, from the boundary of the output feature submap, a second target quantity of submap element rings of the output feature submap from outside to inside as to-be-superimposed element rings, and combines all the selected to-be-superimposed element rings to form a to-be-superimposed area of the output feature submap. The submap element ring is used to represent a plurality of submap elements that are close to each other and distributed in a hollow ring shape and that are in the corresponding output feature submap. The schematic diagram showing an image splicing result shown in FIG. 9 is taken as an example. If the convolution kernel size of the target convolution kernel is 3×3, then the corresponding second target quantity is 3−1=2 in the output feature submap. Next, 2 mutually nested submap element rings are selected from the boundary of the output feature submap from outside to inside as a to-be-superimposed area, so that the remaining submap elements in the output feature submap form a non-superimposed area of the output feature submap (formed by splicing a plurality of solid grids that are close to each other in FIG. 9, each solid grid represents one submap element in the non-superimposed area of output feature submap).

Sub-step S263: performing image splicing on each of the output feature submaps according to a distribution condition of each of the input feature submaps in the input feature map, so as to obtain a corresponding image splicing result.

In this embodiment, when a plurality of output feature submaps are mutually spliced, the distribution positions of the input feature submaps corresponding to the output feature submaps in the input feature map are arranged, so that the image splicing result obtained correspondingly is similar to the input feature map in the feature position distribution, for example, the image splicing result obtained by mutually splicing the 4 output feature submaps in FIG. 9.

Sub-step S264: performing element superimposition on respective contact edge areas of to-be-superimposed areas that are adjacent in position and that are in the image splicing result, so as to obtain the overlapped feature map.

In this embodiment, when the to-be-superimposed areas of different output feature submaps are arranged in the image splicing result, and the adjacent to-be-superimposed areas are in contact with each other, the contact edge area on each of the to-be-superimposed areas is an area range from the edge position that is of the to-be-superimposed area and that is in contact with other to-be-superimposed areas to a non-superimposed area in the output feature submap. For example, in two adjacent output feature submaps located at the top of FIG. 9, the contact edge area of the upper left output feature submap is an area range that is defined by a longitudinal dashed frame in the corresponding to-be-superimposed area, the contact edge area of the upper right output feature submap is an area range that is defined by a longitudinal dashed frame in the corresponding to-be-superimposed area, and the contact edge areas of the two output feature submaps are in contact with each other. In the present disclosure, element superimposition is performed on the contact edge areas of the to-be-superimposed areas that are adjacent in position and that are in the image splicing result, and feature splicing operation is performed on the submap features of the plurality of output feature submaps in the image splicing result, so that the overlapped feature map that includes interference noise and can represent the feature extraction result of the input feature image is obtained.

Therefore, the present disclosure may implement a feature splicing operation on a plurality of output feature submaps by performing sub-step S261 to sub-step S264 described above to obtain an overlapped feature map that includes interference noise and can represent the feature extraction result of the input feature image.

Step S270: cropping a boundary of the overlapped feature map according to the convolution kernel size of the target convolution kernel, so as to obtain a corresponding output feature map.

In this embodiment, the output feature map is used to represent the feature extraction results obtained by computing the input feature map with its corresponding filter, the cropping operation on the boundary may remove interference noise in the overlapped feature map, and a final feature extraction result matched with the input feature map is retained.

Optionally, referring to FIG. 10 and FIG. 11 in combination, FIG. 10 is a schematic flowchart of sub-steps included in step S270 in FIG. 2, and FIG. 11 is a schematic diagram of the distribution of overlapped feature maps according to an embodiment of the present disclosure. In this embodiment, the step S270 may include sub-step S271 to sub-step S273.

Sub-step S271: determining a third target quantity of to-be-cut element rings of the overlapped feature map according to the convolution kernel size of the target convolution kernel, where the third target quantity is equal to the number of rows/columns corresponding to the convolution kernel size minus one.

In this embodiment, the element rings to be ring-cut are used to represent a plurality of feature elements that are distributed in a hollow ring shape and that need to be removed in the overlapped feature map. The third target quantity is used to represent a quantity of element rings to be ring-cut that are close to the boundary of the corresponding overlapped feature map, where the element rings to be ring-cut that are far from the boundary and that are in the adjacent element rings to be ring-cut of the same overlapped feature map are nested by the element rings to be ring-cut that are close to the boundary, and the third target quantity is equal to the number of rows/columns corresponding to the convolution kernel size of the target convolution kernel minus one.

Sub-step S272: selecting a third target quantity of feature map element rings of the overlapped feature map from outside to inside as to-be-cut element rings, so as to obtain a to-be-cut area of the overlapped feature map.

In this embodiment, after determining the third target quantity corresponding to the overlapped feature map, the computer device 10 correspondingly selects, from the boundary of the overlapped feature map, a third target quantity of feature map element rings of the overlapped feature map from outside to inside as to-be-cut element rings, and combines all the selected to-be-cut element rings to form a to-be-cut area of the overlapped feature map. The feature map element ring is used to represent a plurality of mutually-abutted feature map elements that are distributed in a hollow ring shape and that are in the corresponding overlapped feature map. The overlapped feature map shown in FIG. 11 is taken as an example. If a convolution kernel size of a target convolution kernel is 3×3, the corresponding third target quantity in the overlapped feature map is 3−1=2, and then 2 mutually nested feature map element rings are selected from the boundary of the overlapped feature map from outside to inside as the to-be-cut area.

Sub-step S273: performing image cutting on the to-be-cut area in the overlapped feature map, so as to obtain the output feature map corresponding to the input feature map.

Therefore, the present disclosure may remove interference noise from the overlapped feature map by performing sub-step S271 to sub-step S273, so that a final feature extraction result matched with the input feature map is retained.

In this case, by performing step S210 to step S270, the present disclosure reduces the multiplier resource consumption required by the convolution operation process in the image feature extraction process, and effectively suppresses the growth of the adder resource consumption required by the convolution operation process, so that the calculation resource consumption during the feature extraction is reduced as a whole, the feature extraction efficiency is improved, and the convolution optimization effect of the feature extraction convolution neural network is improved.

Optionally, referring to FIG. 12, FIG. 12 is a second schematic flowchart of an image feature extraction method according to an embodiment of the present disclosure. In this embodiment of the present disclosure, compared with the image feature extraction method shown in FIG. 2, the image feature extraction method shown in FIG. 12 may further include step S209.

Step S209: configuring a preset image size according to a convolution kernel size of a target convolution kernel.

In this embodiment, a quantity of rows of an image element corresponding to the configured preset image size is greater than or equal to a quantity of rows of a convolution element corresponding to the convolution kernel size of the target convolution kernel, and a quantity of columns of an image element corresponding to the configured preset image size is greater than or equal to a quantity of columns of a convolution element corresponding to the convolution kernel size of the target convolution kernel.

Therefore, by performing the step S209, the present disclosure ensures that a plurality of the cut input feature submaps are spliced with each other to obtain an input feature map matched with the original feature map, and a Karatsuba algorithm can be used to perform convolution operation on the corresponding input feature submaps and the target convolution kernel.

In the present disclosure, to ensure that the computer device 10 can perform the image feature extraction method by the image feature extraction apparatus 100, the foregoing functions are implemented by dividing the image feature extraction apparatus 100 into functional modules. The following describes specific components of the image feature extraction apparatus 100 provided in the present disclosure.

Referring to FIG. 13, FIG. 13 is a first schematic flowchart of the composition of an image feature extraction apparatus 100 according to an embodiment of the present disclosure. In this embodiment of the present disclosure, the image feature extraction apparatus 100 may include a feature map obtaining module 110, a feature map preprocessing module 120, an input feature cutting module 130, a submap zero-padding module 140, a feature convolution operation module 150, a submap overlapping module 160, and an output feature extraction module 170.

The feature map obtaining module 110 is configured to obtain an original feature map for a target convolution kernel of a feature extraction convolution neural network.

The feature map preprocessing module 120 is configured to perform image preprocessing on the original feature map according to a preset image size to obtain a corresponding input feature map, where an image size of the input feature map is an integral multiple of the preset image size.

The input feature cutting module 130 is configured to cut the input feature map into a plurality of abutting input feature submaps according to the preset image size, where an image size of each of the input feature submaps is consistent with the preset image size.

The submap zero-padding module 140 is configured to, for each of the input feature submaps, perform zero-padding on the input feature submap according to a convolution kernel size of the target convolution kernel to obtain a corresponding preprocessed feature submap.

The feature convolution operation module 150 is configured to, for each of the preprocessed feature submaps, perform convolution operation on the preprocessed feature submap by using the target convolution kernel based on a Karatsuba algorithm to obtain a corresponding output feature submap.

The submap overlapping module 160 is configured to, for a plurality of the obtained output feature submaps, overlap output feature submaps with adjacent corresponding positions according to a distribution condition of each of the input feature submaps in the input feature map to obtain an overlapped feature map.

The output feature extraction module 170 is configured to crop a boundary of the overlapped feature map according to the convolution kernel size of the target convolution kernel to obtain a corresponding output feature map, where the output feature map is used to represent the feature extraction results obtained by computing the input feature map with its corresponding filter.

Figure 14:
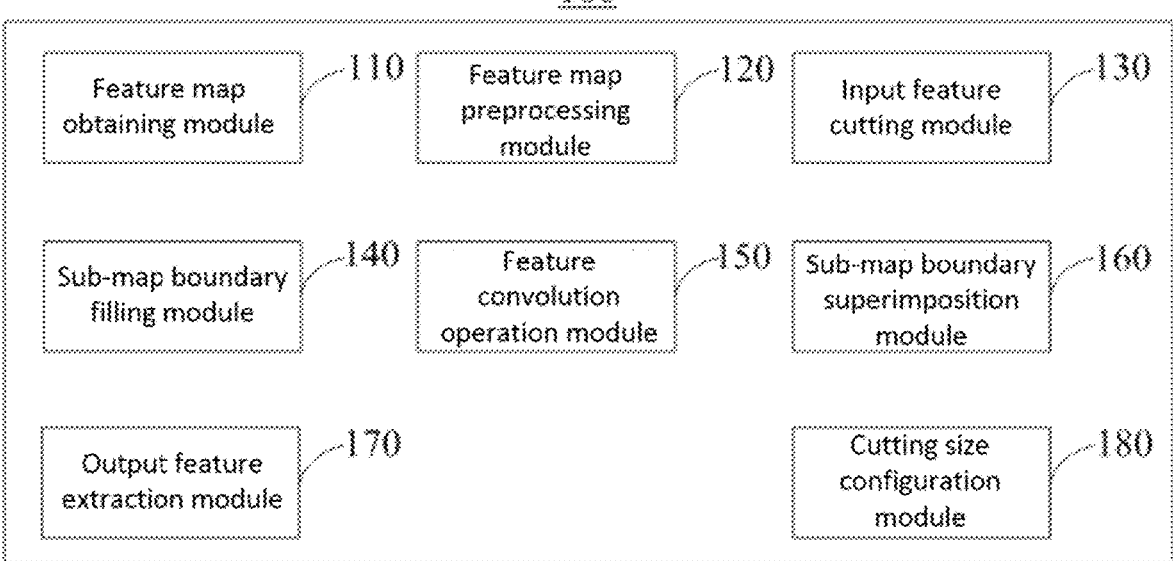
FIG. 14 is a second schematic flowchart of the composition of an image feature extraction apparatus according to an embodiment of the present disclosure.

Optionally, referring to FIG. 14, FIG. 14 is a second schematic flowchart of the composition of an image feature extraction apparatus 100 according to an embodiment of the present disclosure. In this embodiment of the present disclosure, the image feature extraction apparatus 100 may further include a cutting size configuration module 180.

The cutting size configuration module 180 is configured to configure the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

It should be noted that the image feature extraction apparatus 100 according to an embodiment of the present disclosure has the same basic principles and technical effects as those of the foregoing image feature extraction method. For brief description, for parts that are not mentioned in this embodiment, reference may be made to the above description for the image feature extraction method.

It may be understood that the above elements for an image may be image pixels of the image, or image gray scale of the image at a color channel (for example, R (Red), G (Green), or B (Blue) channel), and the specific element expression may be adaptively adjusted according to the image feature extraction requirement.

In the several embodiments provided in the present disclosure, it should be understood that the disclosed apparatus and method can also be implemented in other manners. The apparatus embodiments described above are merely illustrative. For example, flowcharts and block diagrams in the drawings show systematic architectures, functions, and operations of the apparatus, the method and the computer program product possibly implemented according to a plurality of embodiments of the present disclosure. In this regard, each block in the flowcharts or the block diagrams can represent a portion of a module, a program segment or codes, where the portion of the module, the program segment or the codes includes one or more executable instructions for implementing specified logical functions. It should also be noted that, in some alternative implementations, the functions shown in the blocks may occur in an order different from the order shown in the drawings. For example, two consecutive blocks may, in fact, be executed substantially in parallel, and the two blocks may sometimes be executed in a reverse order, depending upon the functions involved. It should also be noted that each block of the block diagrams and/or the flowcharts and a combination of the blocks in the block diagrams and/or the flowcharts can be implemented through a dedicated hardware-based system that executes a specified function or operation, or can be implemented through a combination of a dedicated hardware and a computer instruction.

In addition, the functional modules in the embodiments of the present disclosure can be integrated together to form an independent part, or each module can exist independently, or two or more modules can be integrated to form an independent part. When the functions are implemented in a form of a software functional module and sold or used as an independent product, the functions may be stored in a readable storage medium. Based on such an understanding, the technical solutions of the present disclosure essentially or parts contributing to the prior art or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing readable storage medium includes any medium that can store program code, such as a USB flash drive, a removable hard disk, a read-only memory (ROM), a random access memory (RAM), a magnetic disk, or an optical disc.

In conclusion, in the image feature extraction method and apparatus, the computer device, and the readable storage medium provided by the present disclosure, after an original feature map of a target convolution kernel of a feature extraction convolution neural network is obtained, an input feature map obtained by performing image preprocessing on the original feature map is cut into a plurality of abutting input feature submaps according to a preset image size, and zero-padding is performed on each input feature submap, so that a corresponding preprocessed feature submap is obtained; then, for each preprocessed feature submap, a resource loss of a multiplier in the process of a convolution operation of the target convolution kernel and the preprocessed feature submap is reduced by means of a Karatsuba algorithm, and the growth of adder resource consumption in the process of the convolution operation is effectively suppressed, so that a corresponding output feature submap is obtained; overlapping is performed on output feature submaps with adjacent corresponding positions according to a distribution condition of each of the input feature submaps in the input feature map, so that an overlapped feature map is obtained; and finally, cropping is performed on the boundary of the overlapped feature map, so that a corresponding output feature map is obtained. In this way, the overall computational resource consumption during feature extraction is reduced, thereby improving the feature extraction efficiency.

What is mentioned above is only various embodiments of the present disclosure, but the protection scope of the present disclosure is not limited thereto, and those skilled in the art can easily recognize changes or substitutions within the technical scope disclosed in the present disclosure, and these changes and substitutions shall fall within the protection scope of the present disclosure. Therefore, the protection scope of the present disclosure shall be subject to a protection scope of the claims.

What is claimed is:

1. An image feature extraction method, comprising:
obtaining an original feature map for a target convolution kernel of a feature extraction convolution neural network;

performing image preprocessing on the original feature map according to a preset image size, so as to obtain a corresponding input feature map, wherein an image size of the input feature map is an integral multiple of the preset image size;

cutting the input feature map into a plurality of abutting input feature submaps according to the preset image size, wherein an image size of each of the input feature submaps is consistent with the preset image size;

for each of the input feature submaps, performing zero-padding on an input feature submap according to a convolution kernel size of the target convolution kernel, so as to obtain a corresponding preprocessed feature submap;

for each preprocessed feature submap, performing convolution operation on the preprocessed feature submap by using the target convolution kernel based on a Karatsuba algorithm, so as to obtain a corresponding output feature submap;

for a plurality of obtained output feature submaps, overlapping the output feature submaps with adjacent corresponding positions according to a distribution condition of each of the input feature submaps in the input feature map, so as to obtain an overlapped feature map; and cropping a boundary of the overlapped feature map according to the convolution kernel size of the target convolution kernel, so as to obtain a corresponding output feature map, wherein the output feature map is used to represent a feature extraction results obtained by computing the input feature map with its corresponding filter.

2. The method according to claim 1, wherein the step of, for each of the input feature submaps, performing zero-padding on an input feature submap according to a convolution kernel size of the target convolution kernel, so as to obtain a corresponding preprocessed feature submap comprises:

calculating a first target quantity of blank element rings required by a single input feature submap according to the convolution kernel size of the target convolution kernel, wherein the first target quantity is equal to the number of rows/columns corresponding to the convolution kernel size minus one; and for each of the input feature submaps, externally expandingly and sequentially filling the first target quantity of blank element rings around the input feature submap by taking the input feature submap as a center, so as to obtain the corresponding preprocessed feature submap.

3. The method according to claim 1, wherein the step of, for each preprocessed feature submap, performing convolution operation on the preprocessed feature submap by using the target convolution kernel based on a Karatsuba algorithm, so as to obtain a corresponding output feature submap comprises:

for each preprocessed feature submap, constructing a row-column feature expression of a corresponding input feature submap based on the Karatsuba algorithm according to feature element values of different distribution positions in the corresponding input feature submap;

for the target convolution kernel, constructing a row-column feature expression of the target convolution kernel based on the Karatsuba algorithm according to convolution element values of different distribution positions in the target convolution kernel;

for each preprocessed feature submap, performing splitting and conversion on a multiplication operation process of the row-column feature expression of the corresponding input feature submap and the row-column feature expression of the target convolution kernel based on the Karatsuba algorithm, so as to obtain a corresponding split and converted result; and for each preprocessed feature submap, performing element expression on the corresponding split and converted result based on a preset convolution mapping distribution condition corresponding to the target convolution kernel, so as to obtain the corresponding output feature submap.

4. The method according to claim 1, wherein the step of overlapping output feature submaps with adjacent corresponding positions according to a distribution condition of each of the input feature submaps in the input feature map, so as to obtain an overlapped feature map comprises:

determining a second target quantity of to-be-superimposed element rings of a single output feature submap according to the convolution kernel size of the target convolution kernel, where the second target quantity is equal to the number of rows/columns corresponding to the convolution kernel size minus one;

for each of the output feature submaps, selecting a second target quantity of submap element rings of a output feature submap from outside to inside as the to-be-superimposed element rings, so as to obtain a to-be-superimposed area of the output feature submap;

performing image splicing on each of the output feature submaps according to the distribution condition of each of the input feature submaps in the input feature map, so as to obtain a corresponding image splicing result; and performing element superimposition on respective contact edge areas of to-be-superimposed areas that are adjacent in position and that are in the image splicing result, so as to obtain the overlapped feature map.

5. The method according to claim 1, wherein the step of cropping a boundary of the overlapped feature map according to the convolution kernel size of the target convolution kernel, so as to obtain a corresponding output feature map comprises:

determining a third target quantity of to-be-cut element rings of the overlapped feature map according to the convolution kernel size of the target convolution kernel, wherein the third target quantity is equal to the number of rows/columns corresponding to the convolution kernel size minus one;

selecting a third target quantity of feature map element rings of the overlapped feature map from outside to inside as the to-be-cut element rings, so as to obtain a to-be-cut area of the overlapped feature map; and performing image cutting on the to-be-cut area in the overlapped feature map, so as to obtain the output feature map corresponding to the input feature map.

6. The method according to claim 1, wherein the method further comprises:

configuring the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

7. An image feature extraction apparatus, comprising:

a feature map obtaining module, configured to obtain an original feature map for a target convolution kernel of a feature extraction convolution neural network;

a feature map preprocessing module, configured to perform image preprocessing on the original feature map according to a preset image size, so as to obtain a corresponding input feature map, wherein an image size of the input feature map is an integral multiple of the preset image size;

an input feature cutting module, configured to cut the input feature map into a plurality of abutting input feature submaps according to the preset image size, wherein an image size of each of the input feature submaps is consistent with the preset image size;

a submap zero-padding module, configured to, for each of the input feature submaps, perform zero-padding on an input feature submap according to a convolution kernel size of the target convolution kernel, so as to obtain a corresponding preprocessed feature submap;

a feature convolution operation module, configured to, for each preprocessed feature submap, perform convolution operation on the preprocessed feature submap by using the target convolution kernel based on a Karatsuba algorithm, so as to obtain a corresponding output feature submap;

a submap overlapping module, configured to, for a plurality of obtained output feature submaps, overlap the output feature submaps with adjacent corresponding positions according to a distribution condition of each of the input feature submaps in the input feature map, so as to obtain an overlapped feature map; and an output feature extraction module, configured to crop a boundary of the overlapped feature map according to the convolution kernel size of the target convolution kernel, so as to obtain a corresponding output feature map, wherein the output feature map is used to represent a feature extraction results obtained by computing the input feature map with its corresponding filter.

8. The apparatus according to claim 7, wherein the apparatus further comprises:

a cutting size configuration module, configured to configure the preset image size according to the convolution kernel size of the target convolution kernel, wherein a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

9. A computer device, comprising a processor and a memory, wherein the memory stores a computer program that can be executed by the processor, and the processor can execute the computer program to implement the image feature extraction method according to claim 1.

10. The method according to claim 2, wherein the method further comprises:

configuring the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

11. The method according to claim 3, wherein the method further comprises:

configuring the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

12. The method according to claim 4, wherein the method further comprises:

configuring the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

13. The method according to claim 5, wherein the method further comprises:

configuring the preset image size according to the convolution kernel size of the target convolution kernel, where a quantity of rows corresponding to the preset image size is greater than or equal to a quantity of rows corresponding to the convolution kernel size, and a quantity of columns corresponding to the preset image size is greater than or equal to a quantity of columns corresponding to the convolution kernel size.

* * * * *